Jan. 9, 1951
W. C. LILLIENDAHL
2,537,067
PRODUCTION OF THORIUM
Filed April 24, 1946
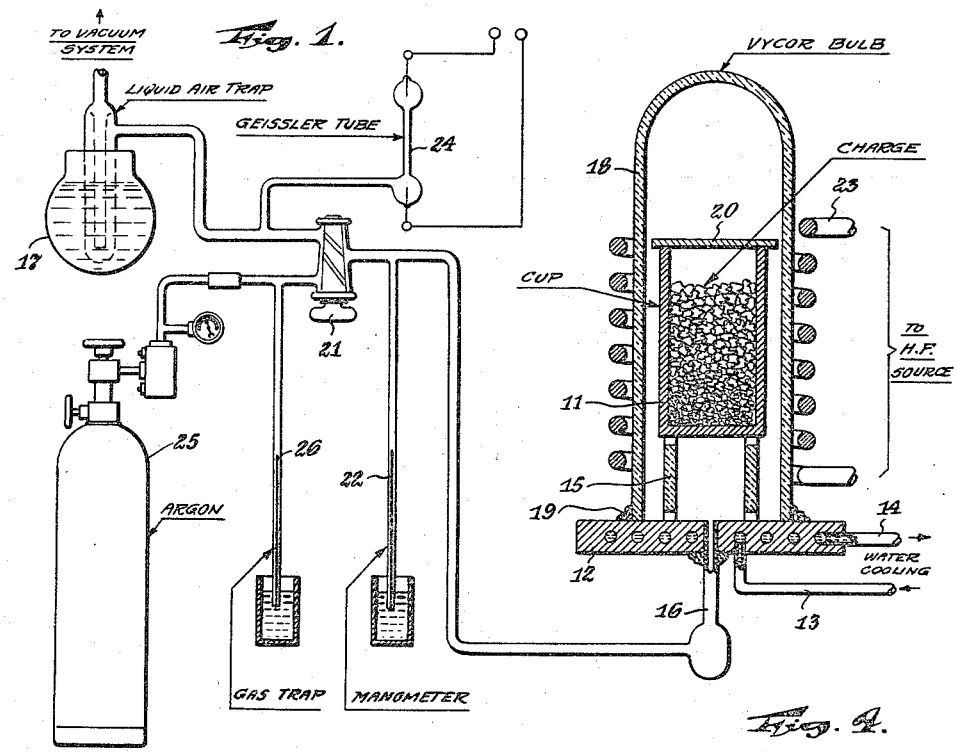
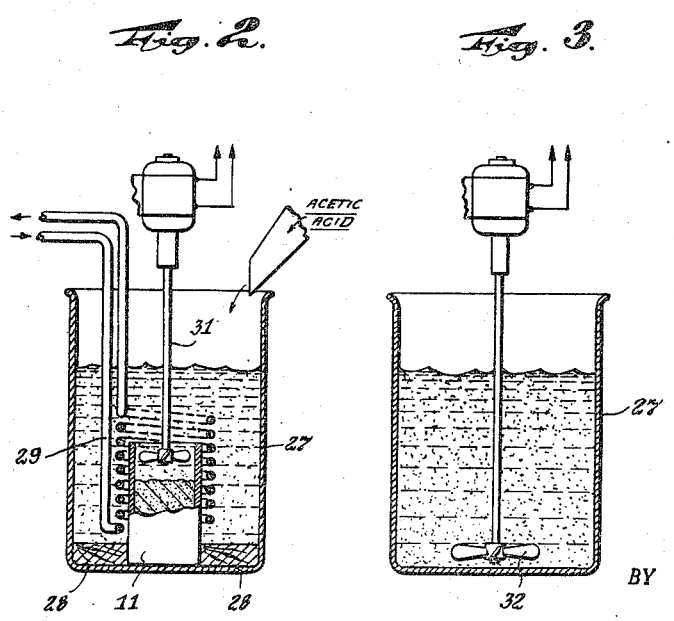
INVENTORS
W. C. LILLIENDAHL
BY
ATTORNEY Patented Jan. 9, 1951

2,537,067

UNITED STATES PATENT OFFICE 2,537,067

PRODUCTION OF THORIUM

William C. Lilliendahl, Mountain Lakes, N. J., assignor to Westinghouse Electric Corporation, East Pittsburgh, Pa., a corporation of Pennsylvania Application April 24, 1946, Serial No. 664,583

1 Claim. (Cl. 75—84)

This invention relates to thorium, more particularly to the production of metal of an exceptionally high degree of purity, and to an improved method for the manufacture thereof.

The principal object of my invention, generally considered, is to produce thorium by reaction of a mixture of the chloride and oxychloride or one of said compounds with calcium, said reaction taking place in a cup enclosed in a container, said container being filled with an inert gas, as distinguished from the prior practice of reducing the oxide in a heavy-walled iron bomb with a ground-in stopper, said bomb being heated in open air.

Another object of my invention is to produce thorium powder by heating a compound, or mixture of compounds of thorium, and calcium by high-frequency induction, the reaction cup being enclosed in a bell jar of high-silica glass, that is, one of 96% silica glass, or one of quartz or similar material.

A further object of my invention is to treat the powder produced in accordance with the above, to consolidate it into coherent metal and to form to the desired shape.

Other objects and advantages of the invention will become apparent as the description proceeds.

Referring to the drawing:

Fig. 1 is a diagrammatic view, with parts in section, of apparatus for producing thorium in powder form.

Fig. 2 is a vertical sectional view of apparatus for leaching the contents of the cup used in the reduction of the thorium compounds, to remove the thorium powder produced therein.

Fig. 3 is a vertical sectional view of apparatus for washing the thorium powder produced.

Fig. 4 is an elevational view of apparatus, with parts in vertical section, illustrating how the powder produced may be washed and dried.

The reduction of rare metal oxides, including thoria, by calcium or other reducing agents, has previously been accomplished in heavy-walled iron bombs, with a ground-in stopper held in place by a screw cap. Such devices have a number of limitations and disadvantages, to wit:

It is difficult to maintain an air-tight joint between the stopper and bomb and to prevent reoxidation of the thorium powder produced as the bomb cools, or during the heating process. Considerable warping of the bomb occurs during heating and cooling, thus necessitating time-consuming lapping operations between runs. The construction of bombs has been limited to materials which will resist oxidation at elevated temperatures, and iron or iron alloys have generally been used for economy. Bombs were without exception of heavy-walled construction to permit sufficient surface area for sealing and presumably to withstand pressure produced in the reaction.

From thermo-chemical data and a consideration of the products formed in the reaction between thorium oxide and calcium, it was concluded that the pressures developed in the reaction were insufficient to necessitate the heavy-walled bombs previously used. These conclusions were tested by placing an open iron cup under a high-silica glass (or quartz) bell jar, evacuating the bell jar, and then heating the iron cup by high frequency induction to cause the calcium to reduce the thorium oxide. Vaporization of the calcium was suppressed by filling the jar with argon gas at a pressure slightly less than atmospheric. There was no abnormal pressure produced during the reaction, very little vaporization of calcium, and satisfactory thorium metal was obtained. Such invention is covered by application Serial No. 574,130, filed January 23, 1945, now Patent No. 2,446,062, dated July 27, 1948.

An object of the present invention is to produce thorium metal by the reduction of chlorine compounds of thorium, such as thorium chloride, thorium oxychloride, or a mixture of said compounds, with calcium. The advantages of using these compounds either alone or as mixture will become apparent as the description proceeds.

In the reduction of thorium oxide with calcium, the reaction is only slightly exothermic so that the temperature attained during reduction is dependent almost entirely on the external heat supplied by the high frequency coil. This results in a relatively fine powder. On the other hand, the reaction between thorium chloride and calcium is very exothermic resulting in high localized temperatures in the reaction cup, thus producing a considerable coarsening effect on the final powder produced. This is desirable in subsequent operations such as washing, drying, storing and pressing. Furthermore, the product of the reaction, in the case of thorium chloride, is calcium chloride which is fluid at the temperatures attained during reduction. This acts as a flux to obtain more fluid conditions in the cup, assists in melting the calcium, and thus increases the activity of the reaction.

If the amount of $ThOCl_2$ is relatively low in the salts used, the calcium oxide formed is dissolved in the calcium chloride formed, thus fluxing the calcium during the reduction.

In producing thorium by this process, thorium chloride, or a mixture of thorium chloride and oxychloride are desirably prepared. For such preparation, various reactions are described in the literature, i. e.—passage of; chlorine over a mixture of carbon and thorium oxide; chlorine admixed with sulfur monochloride over thorium oxide; carbon tetrachloride over heated thorium oxide; and dehydration of thorium chloride with ammonium chloride at 500° C. All of these reactions will produce thorium chloride with varying amounts of thorium oxychloride.

In the preparation of thorium chloride, a convenient starting compound is the nitrate which may be dissolved in water and thorium precipitated as the hydroxide with ammonia. This is then filtered, washed with water, and dissolved in hydrochloric acid. The thorium is then reprecipitated with ammonia, redissolved in hydrochloric acid, and the solution evaporated to dryness. The partially dried chloride is transferred to a silica boat and a stream of chlorine gas saturated with sulfur monochloride passed over the product at approximately 500° C. in a tube furnace. Heating is continued until no appreciable change in weight occurs. The product is cooled and transferred to a tightly stoppered bottle. Analysis of the product shows approximately 70% ThCl$_4$ and 30% ThOCl$_2$.

In reducing the product mentioned above to thorium metal powder, distilled calcium was cut to pass through a ⅛″ mesh screen and mixed therewith. Mixing is preferably done in an air-conditioned room, because of the hygroscopic character of the salt.

In Fig. 1 there is shown apparatus for effecting the reduction of the selected thorium compound to metal. This involves a cup or crucible 11 formed of a suitable metal, relatively inert to thorium at elevated temperatures, preferably molybdenum, although a molybdenum-lined iron cup, or one formed of iron or steel may be employed. However, if thorium of a very low iron content is desired, molybdenum or its equivalent must be used. The cup is supported above a metal plate 12 which is preferably cooled by circulating water therethrough, by means of inlet pipe 13 and outlet pipe 14. The cup preferably rests on a hollow refractory insulator 15. A mixture of the selected thorium compound or compounds and granulated, distilled calcium (5 to 10 mesh) is placed in the cup. A molybdenum cover 20 is desirably placed on top of the cup, to prevent dusting of the charge during evacuation, reduce deposition of calcium on the "Vycor" bulb during the reaction, and produce more uniform heating conditions within the cup. A preferred mixture is 70 grams of the 70% thorium chloride, 30% thorium oxychloride mixture, and 34 gms. of calcium, which represents an excess of approximately 98% or 100% over that theoretically required, in accordance with the equations:

and

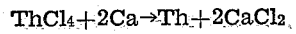

This weight of calcium is preferred, although satisfactory metal has been produced with as low as 75% excess. As previously mentioned, it is desirable to produce as fluid a condition of the charge as possible during the reduction, and increasing the excess of calcium promotes this condition. The suggested 70% thorium chloride, 30% thorium oxychloride mixture is preferred only because it is difficult to make and store 100% thorium chloride.

The metal plate 12 is tubulated, as indicated at 16, and connected to a high vacuum exhaust system which may conveniently comprise a high vacuum pump, a mercury diffusion pump, and a liquid air trap 17. A 96% silica bell jar or bulb 18, just large enough to slip over the cup, is set on the metal base and sealed vacuum tight, preferably by means of vacuum wax 19. The jar is then exhausted to a high vacuum through valve or stop cock 21, a Geissler tube 24 serving, by failure of a discharge, to indicate the degree of exhaust desirably obtained.

Argon gas (99.7%) is then admitted to the bell jar 18 as from tank 25 through valve 21 to a pressure of about three quarters of an atmosphere. A mercury column 22 indicates this pressure. A gas trap or "blow-off" 26, comprising a mercury column, is provided to sweep out the argon line to cock 21 prior to filling the system. The metal cup 11 is then slowly heated to from 1100° C. to 1200° C. for about 15 minutes, by energizing the coil 23 by high-frequency electrical power, to melt the calcium and reduce the thorium compound to metal powder.

Under the conditions specified, the reaction appears to start at a temperature of approximately 500° C. to 600° C. Moderate pressures are produced by the heat of the reaction so that it was found advisable to partially evacuate the container during the course of the reaction to maintain a positive pressure on the outside of the bell jar, that is, from five to ten centimeters of mercury, and insure a good seal. The apparatus is then allowed to cool.

After the cup and charge have thoroughly cooled, the cup is removed and placed in a jar or receptacle 27 containing water and acetic acid, which dissolves the excess calcium, calcium chloride, and calcium oxide, formed in the reaction, as represented in Fig. 2. While in the receptacle 27, the cup 11 is preferably centered, as by means of a block of wood 28, and cooled during the process of leaching as by means of a coil of pipe 29, preferably stainless steel, through which water circulates. The mixture of water and acetic acid is preferably stirred as by means of a stainless steel motor-driven stirrer 31.

A desirable manner of leaching is to add 6 to 8 liters of water to the jar 27, of 10 to 12 liters capacity, Acetic acid is added gradually, 100 to 200 cc. at a time, until approximately one liter has been added, stirring continuously to complete removal of the charge from the cup. This operation usually takes from 3 to 8 hours, depending upon local conditions of heating during reduction.

After the charge is leached out of the cup, the wooden block, molybdenum cup, and cooling coil, are removed, and the powder allowed to settle for about 20 minutes. The supernatant liquid is poured off and about 3 liters of water, added, plus an equal volume of glacial acetic acid, and stirring is continued for about 1 hour with the propeller 32 of the stirring apparatus well down into the jar to insure maximum agitation, as represented in Fig. 3. The powder is then allowed to settle for about 15 minutes and the supernatant liquid poured off.

The powder in the bottom of the container is then washed with water, using 4 to 5 liters per wash, stirring for 5 minutes, and settling for 15 minutes between pour offs. This operation is repeated 9 or 10 times.

During the first washings, the supernatant liquid is cloudy due to the presence of fines. These are not filterable and are discarded. As the supernatant liquid becomes clearer, a white turbidity appears which is probably due to the reaction of the acid and water on very fine particles. With continued washing, this cloudiness disappears, and when this point is reached the powder is thrown on Buchner funnel 33, as illustrated in Fig. 4, using suction as applied to tube 34 of flask 35. A relatively coarse filter paper is preferably used in the funnel, the tubulation 36 of which passes through a cork 37 in the neck of flask 35. The powder is washed with water until the filtrate is clear, and then with alcohol and ether in succession.

The metal powder, after removal from the Buchner funnel, may be dried and further treated and consolidated as described in Patent No. 2,446,062, previously referred to.

From the foregoing it will be seen that I have devised an improved method of manufacturing thorium in which the reaction is carried out in a transparent bulb so that the progress thereof can be visually ascertained. By virtue of carrying out the reaction in a closed container and in an inert gas atmosphere, the product is protected from deterioration as the inert gas can neither escape during the reaction, nor air or other gas enter the container during cooling.

Although a preferred embodiment of my invention has been described, it will be understood that modifications may be made within the spirit and scope of the appended claim.

I claim:

The method of manufacturing thorium comprising mixing a compound thereof selected from the group consisting of the chloride, the oxychloride, and mixtures thereof, with granulated distilled calcium in the proportion of about 70 parts by weight of the former to about 34 parts by weight of the latter, placing said mixture in a cup of moylbdenum, supporting said cup on a refractory insulator which rests upon a cooled metal plate, placing a molybdenum cover on said cup, placing a glass bell jar over said covered cup, sealing said jar to said plate, exhausting said jar to a high degree of vacuum, admitting inert gas to said jar to a pressure of about three-quarters of an atmosphere, placing a high-frequency coil around said jar, energizing said coil and slowly heating said cup to from 1100° C. to 1200° C. for about fifteen minutes to melt the calcium and reduce the thorium compound to metal powder, cooling and removing said cup, dissolving the excess calcium, calcium chloride, and calcium oxide by means of dilute acetic acid, allowing the thorium powder as removed from said cup to settle, decanting the liquid therefrom, washing the powder until cloudiness in the wash water disappears, filtering said powder with suction, washing with water until the filtrate is clear, washing with alcohol, washing with ether, and drying.

WILLIAM C. LILLIENDAHL.

REFERENCES CITED

The following references are of record in the file of this patent:

UNITED STATES PATENTS

| Number | Name | Date |
| --- | --- | --- |
| 1,573,083 | Marden et al. | Feb. 16, 1926 |
| 1,646,734 | Marden | Oct. 25, 1927 |

OTHER REFERENCES

"Industrial & Engineering Chemistry," vol. 18, No. 2 (1926), pages 115 and 116.

"Industrial & Engineering Chemistry," vol. 19, No. 1 (1927), pages 97 and 98.

"Zeitschrift fur Anorganische Chemie," vol. 87, (1914), pages 211–216.